Patented Sept. 6, 1932

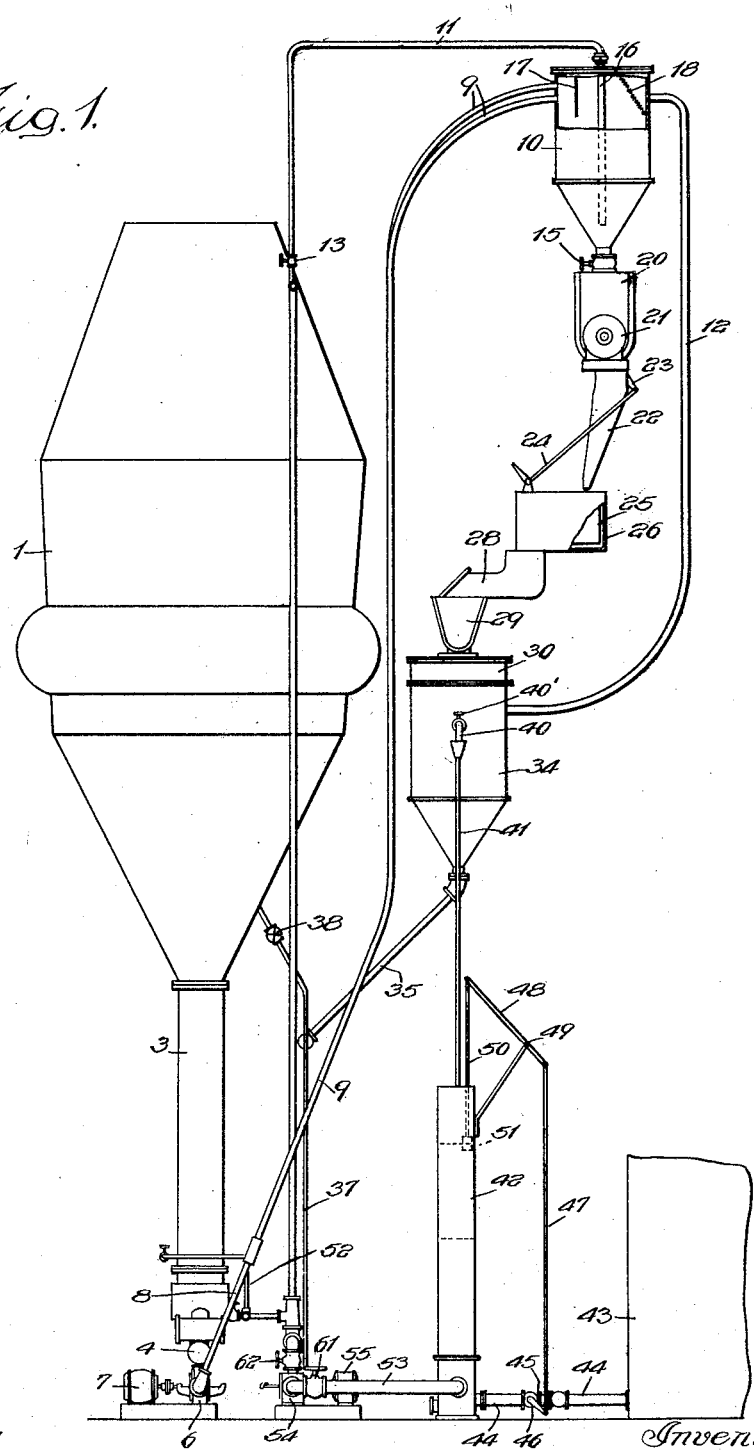

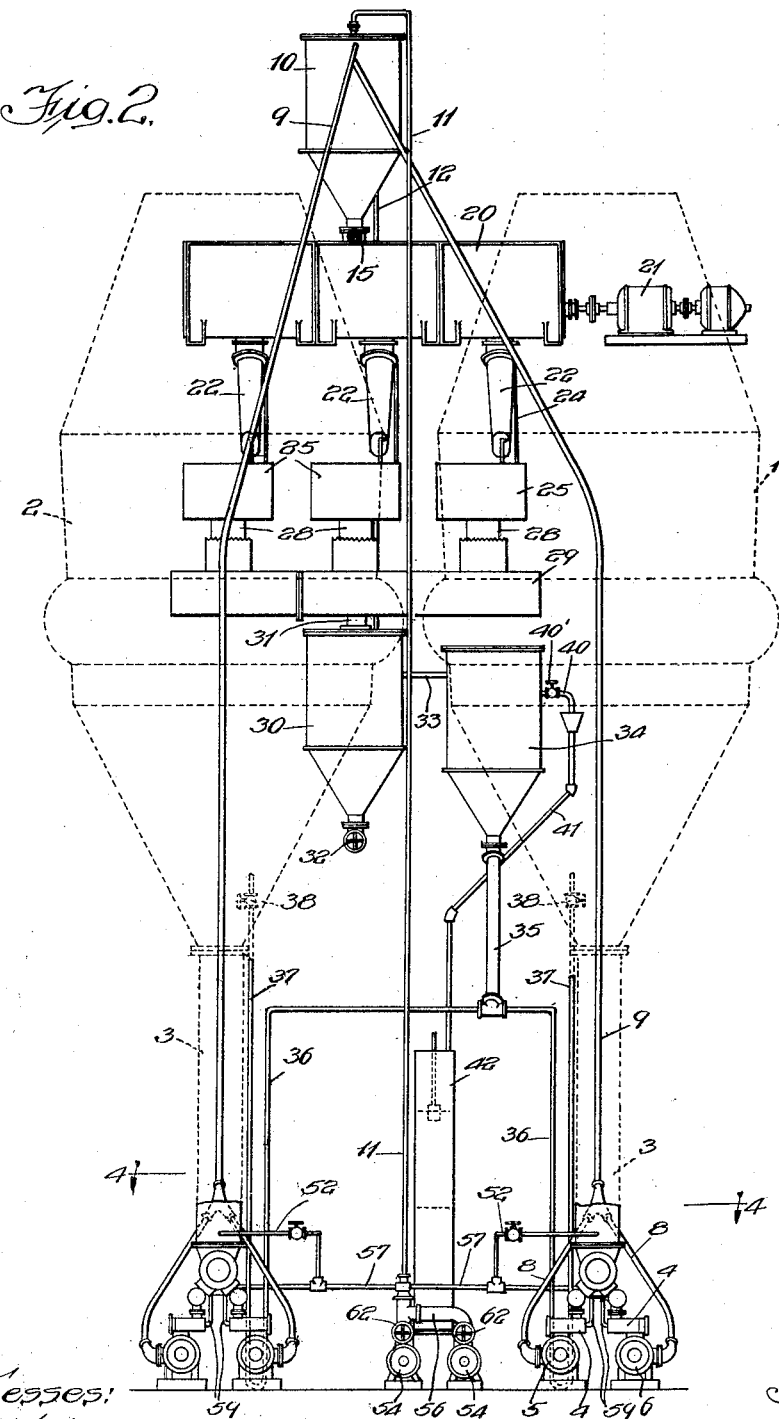

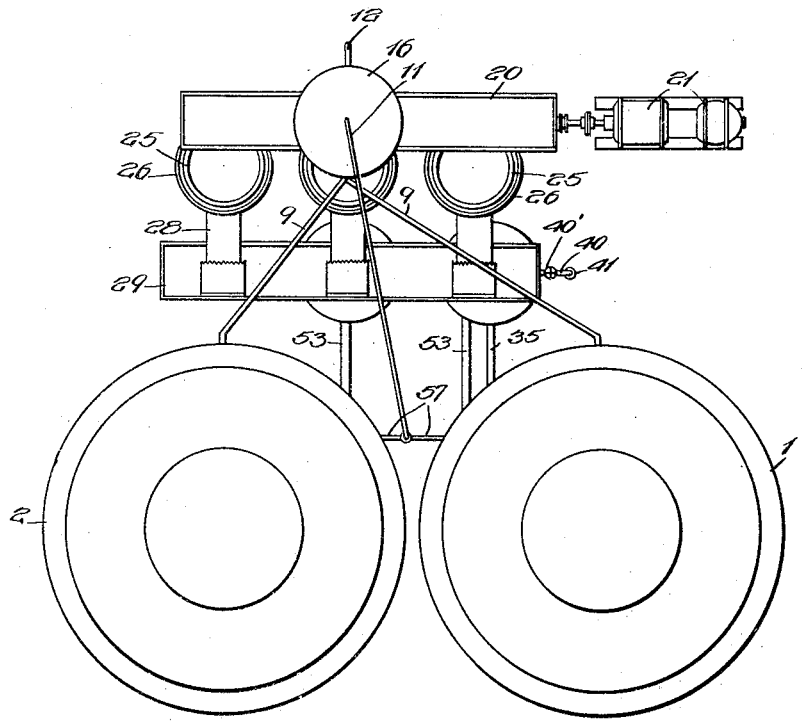
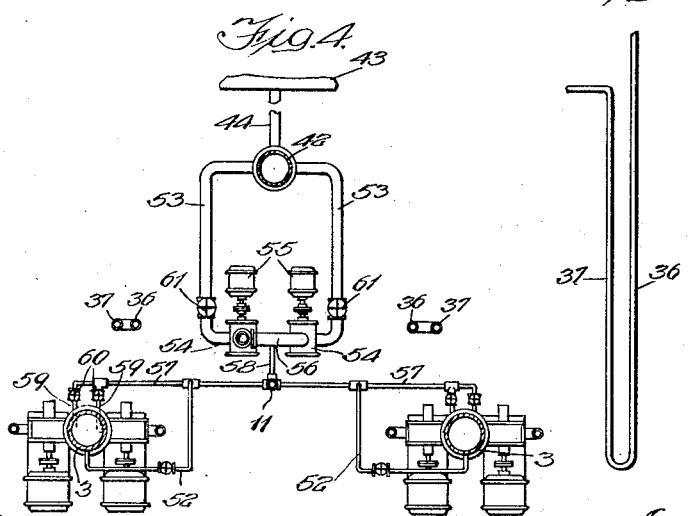

1,875,354

UNITED STATES PATENT OFFICE

THOMAS RAY AND JOSHUA R. RAY, OF MANISTEE, MICHIGAN

METHOD AND APPARATUS EMPLOYED IN THE WASHING AND PRODUCTION OF SALT OR THE LIKE

Application filed November 19, 1924. Serial No. 750,888.

Our invention relates particularly to a method and apparatus employed in and particularly adapted for the treating and manufacture of salt, but it will be obvious to those skilled in the art there are other fields in which the same might be employed. The invention has among its objects the production of a simple, convenient, rapid, efficient and satisfactory method for salt treatment and apparatus suitable and satisfactory for carrying out the method or process described. It has particularly as an object the production of an apparatus which will permit the continuous carrying on of the method, will require a minimum of attention and labor, and will produce the whiter and more satisfactory salt. Many other objects and advantages of the method and the apparatus shown and described will be obvious to those skilled in the art from the disclosures herein given.

To this end our invention consists in the novel construction, arrangement and combination of parts herein shown and described, and more particularly pointed out in the claims.

In the drawings, wherein like reference characters indicate like or corresponding parts;

Fig. 1 is a view in elevation illustrating the apparatus;

Fig. 2 is also a view in elevation illustrating a portion of the apparatus, the evaporating pans in front being shown in dotted lines;

Fig. 3 is substantially a top elevation of the apparatus;

Fig. 4 is a sectional view taken substantially on line 4—4 of Fig. 2; and

Fig. 5 is a detailed view illustrating the pipes 36—37.

Referring to the drawings, in which the preferred embodiment of the apparatus is shown, we shall first describe the apparatus, as the method will then be more clearly understood, it being understood that to a certain extent some of the apparatus is shown somewhat diagrammatically.

We have illustrated an installation consisting of two vacuum or evaporating pans 1 and 2, these pans being of the desired size, shape and material, and constructed in such a manner as to give the most efficient results. We have not considered it necessary to illustrate in detail the vacuum pan construction as such pans are known in the art, nor have we shown in detail the heating apparatus, etc. Pans and vacuum apparatus more or less of the type illustrated are shown in the Ray Patents No. 920,997, and No. 1,428,557, as well as others. The salt brine in the pan is subjected to heat and evaporated, the salt being heavier than the brine, settles to the bottom and is discharge through the leg pipes 3. A pump is provided for each leg pipe 3 and as a matter of fact we prefer to employ two pumps, 5 and 6, for each so that if one of them becomes stopped up with salt and has to be shut down and washed out with fresh water, the other may be operated without interfering with the process. It is also an advantage as in case the pan produces a great deal of salt or should any part of the receiving apparatus be stopped for a short time, the two pumps may be operated simultaneously to take care of the accumulated salt.

The salt is taken from the leg pipe 3 through the valve, the leg pipe being kept full of salt about two to three feet above the valve. A brine jet is introduced just above the suction opening from the large pipe 3 to the pump, as will be hereinafter described, this being the first washing jet and makes the salt flow freely to the screen box. This also provides a suction control, keeping the level of salt in the leg pipe as nearly constant as possible. As shown the salt screen boxes 4 are arranged in the system between the leg pipes 3 and the pumps. The salt is delivered into the screen boxes through which all of the salt in the pan must pass. Should there be any hard pieces of salt scale, or in fact, any foreign substances such as bolts or nuts or other things which might be dropped in the pan when cleaning or during examination before the run, in place of having to empty the pan to recover the article dropped, the article would be caught in the screen box and kept from injuring the pump. At this point the fresh brine, usually cold, is injected into the screen box above the screen, as will be hereinafter described, in such manner that it washes the salt through the openings of the screen and keeps the pump in regular operation.

The pumps may be of any suitable type, centrifugal pumps, however, being preferred. These pumps may be driven from any suitable source of power as for example electric motors 7, and as a precaution each pump is shown provided with its individual driving motor so that should any motor become inoperative, the process would not be interrupted. As shown, the discharge port of each pump connects with the pipes 8, which may be connected to a single pipe 9 which extends to a separating or storage tank 10, which may be termed the segregating tank.

The separating tank 10 is of the desired size and shape. The same is also provided with a jet pipe 11 for the admission of fresh brine to the tank should the solids settle too solid to flow through valve 15, as will be hereinafter more fully described. The same is also provided with an overflow pipe 12. Admission of fresh brine through pipe 11 may be controlled by valve 13 or its equivalent arranged where desired. The tank is provided with a discharge normally controlled by a valve 15 or other suitable shutoff.

We have illustrated in Fig. 1 the pipe 11 projecting into the tank as indicated at 16 and substantially to the lower portion thereof. We have also shown a baffle 17 adjacent the pipes 9—9 and a baffle 18 at the overflow pipe. This tank is chiefly intended as a separating tank for separating the salts from the brine pumped from the pan, and these salts are dumped into the mixer. The pump pumps a continuous stream of brine and salt from the pan, which salt is run continually into the mixer 20 as fast as it settles out of the brine. The tank also separates the brine from the salt, the brine flowing out of the tank by gravity through the overflow pipe 12 to a tank below hereinafter described, the salt settling and remaining in the tank. The impurities washed off of the salt crystals are carried off to the lower tank.

The mixer 20 is substantially a tank or container, which is provided with paddles or mixers therein (not shown) of any suitable type arranged to be actuated by a suitable source of power, as for example the motor or motors and reduction gear 21. The purpose of the mixer tank 20 is to keep the salts from settling out of the brine and keep it in a semi-liquid mass so that it will flow and spread evenly on the centrifugal dryer 25. The dryer is used for drying the salt by centrifugal action as it throws the brine out of the salt when rotating at a high speed. This salt in the centrifugal must be very wet or semi-liquid, and must be of an equal consistency throughout so that it will spread equally on the centrifugal as otherwise the centrifugal will be out of balance when rotating at a high speed, thereby causing excessive vibration as well as danger of the centrifugal breaking.

As shown, spouts 22 extend from the mixer to the centrifugals, a plurality of centrifugals being shown. We have not considered it necessary to illustrate the centrifugals in detail, nor the driving means therefor as any suitable apparatus of the kind may be employed such as are at present known in the art. As mentioned, there is a spout 22 for each centrifugal, the discharge from the mixing tank into the centrifugal being controlled by suitable valves or the like of which only the operating arm 23 and operating rod 24 are shown. The controlling arrangement may be as described. The salt after being washed in its course and then dried in the centrifugal dryer is dropped out of the bottom of the centrifugal onto a suitable conveyor (not shown) which carries it to the storage house or wherever desired. The brine thrown out through the sides of the centrifugals is collected in an outside casing 26, and from there through the conduits 28 to a trough 29 or the like, from which it is eventually discharged into a tank 34.

We have shown, however, an intermediate tank 30 arranged to receive the brine discharged from the trough 29 through the pipe 31, tank 30 being substantially a settling tank. We have found from experience that we can separate a great deal of the gypsum and other impurities which may be present in the salt, by this process by discharging the same into the tank 30, which may be termed the gypsum tank. In this tank the brine stands and separates from the gypsum and flows into the brine feed tank 34 through the pipe 33. The gypsum and other impurities, after being washed off the crystals with this process in the previous steps, is thrown out with the brine through the screens on the centrifugals and separates by the standing. The gypsum may be discharged intermittently from the bottom of this tank, 32 representing a shutoff or a valve or the equivalent. The brine feed tank 34 is provided with the discharge pipe 35 arranged to discharge into the vacuum pans. As shown, this pipe connects with the pipes 36 which are connected with the pipes 37 extending to the vacuum pans. Valves 38 or their equivalent may be employed at the desired point in the piping.

Pipes 36—37 may be termed leg pipes, this construction being preferred (see Fig. 5) so that the brine will seal the pipes should the brine for some reason fail to fill the tank 34. There may also be employed an additional feed pipe and pump for discharging brine into the pan independent of the pipe 37, if desired. Tank 34 is also provided with an overflow pipe 40 which may be controlled by a suitable valve 40', the discharge from pipe 40 being carried through pipe 41, in the apparatus, shown to a tank 42, from which it may be and is pumped back into the system as required.

We have shown a source of brine supply represented by the tank 43, which is connected by suitable piping 44 to the tank 42, a valve 45 being preferably arranged for controlling the discharge or admission of fresh brine through pipe 44 to the system. As shown, an automatically operable valve is preferred, a simple construction consisting of the valve lever 46 connected by 47 to an arm 48 pivotally supported at 49. The opposite end of the arm 48 is connected by a rod 50 or the equivalent to a float 51 or equivalent controlling mechanism. Obviously, if the level of the fluid in tank 42 varies, valve 45 will be controlled so as to maintain substantially a constant level or supply in the tank 42.

Extending from the tank 42 is a pipe 53, there being preferably two pipes 53 as most clearly shown in Fig. 4. These pipes extend to the pumps 54 which may be driven by the motors 55 or equivalent means for the purpose. These pumps are provided with the discharge pipes 56 connected through pipe 58 to piping 57, which preferably is connected by means of the piping 59 to the salt screen boxes 4, valves 60 being preferably provided. As shown, pipes 52, provided with suitable valves, are arranged to introduce a brine jet above the suction opening from the leg pipe 3 to the pump. The pipe 52 is shown receiving brine from the pipe 57, the jet making the salt flow freely to the screen box. We also prefer to provide the valves 61 or their equivalent. Addition of valves 62 may also be provided if desired. It will be noted that the pipe 11, as well as the pipes 57, is connected with the pipe 58 so that brine may be pumped through pipe 11 into the tank 10 as previously referred to.

The operation of the system and the method or processes referred to may be briefly described as follows, it being understood that the system is in operation with the brine and salt in the pans, tanks and piping as referred to. The salt and brine is pumped by the pumps 5 through the pipes 8 and 9 into the upper separating or segregating tank 10 from whence it is discharged into the mixing tank 20 where it is kept in a mixed and semi-liquid condition. The separating tank 10 constitutes a receiver for the salt pumped from the pan before it is dumped into the mixer, as the pump pumps a continuous stream of brine and salt from the pan and this is run into the mixer. This separating tank also separates brine from the salt and allows the brine to flow out of the tank by gravity into the lower tank, the salt remaining in tank 10. Such additional brine as required may be added to the system by the discharge through pipe 11, and surplus or top brine will flow out through pipe 12 down to the brine feed tank 34. Brine from pipe 11 keeps brine flowing in case it has a tendency to set in the tank 10 and not flow freely to the mixer. The co-mixed salt and brine is discharged as required into the centrifugal 25. The level of the contents of the mixer is, so far as possible, kept substantially constant, this being possible particularly if the centrifugals are used regularly. From the centrifugals the dried or separated salt is taken and conducted away in any desired manner for storage, or packing, while the brine separated out is returned to the brine feed tank 34. As before mentioned, this is preferably taken through the gypsum tank 30, the gypsum and other impurities which were in suspension being removed from the tank from time to time. From the tank 34, the brine can return back to feed the vacuum pan while any excess brine may be discharged through pipe 41 into the tank 42.

The brine jet introduced above the suction opening from leg pipe 3 to the pump is the first washing jet, and not only makes the salt flow freely to the screen box, but, as before mentioned, enables the operator to keep the level of salt in leg pipe 3 as near constant as possible, usually about two or three feet above the valve. The fresh brine, which is usually cold and injected into the screen box above the screen, washes the salt through the openings of the screen, keeping the pump in regular operation. Generally in practice the amount of brine injected and mixed with the salt is about four times the amount of salt, substantially this amount being found desired to normally furnish the supply for the salt making in the pan. The amount should be a little greater than the actual amount required, so that a slight amount of brine will constantly flow through the overflow from the supply tank 34. This overflow shows the pan operator that he has a supply of brine and keeps the apparatus from overflowing in case the pump operator should require a little more brine to wash off some of the apparatus.

Additional brine pumped in through pipes 57 to the salt screens 4 facilitates the washing or cleansing of the salt and removing impurities that may be on the surface, the added brine passing to the segregating tank 10 as mentioned, with the brine from the pans. The surplus brine returned through pipe 41 to tank 42 will return to the system, and if there is any considerable amount, it will be noted that the tank 43, because of the automatic valve, will not supply as much under those circumstances.

The brine passing through the pipe 57 to the pumps and pipe 11 to the segregating tank is controlled by the valves which are set so that the required quantities are delivered as required, it not being necessary as a general thing for these valves to be varied after once set. The valves which control the passage of the brine into the pans are usually operated to allow the pans to keep the level in the brine at a certain point irrespective of how much salt is made, but additional brine can be pumped into the pan by the independent feeding mechanism referred to, as required. It is desirable, however, to use all the brine that can be put through the system as it takes the heat out of the salt. The valve 40' ordinarily is left open so as to allow all of the brine which does not go into the pan to overflow in this way, a slight overflow being desired as mentioned, and generally the system operates so perfectly and correctly that there is very little overflow.

From the preceding it will be noted that the process is substantially a continuous one, the process itself tending to clarify and wash and cleanse the salt so that a very satisfactory product is discharged from the centrifugals. It will also be particularly noted that with the system installed as shown, there is no possibility of the process being at any time interrupted by break-down or clogging as in the event that any of the pumps' source of power, or the like, becomes inoperative the reserve apparatus may be instantly thrown into operation. Likewise, in the event of an overload or excess of salt as it might be termed, the reserve apparatus may be used supplementary.

Everything is as nearly fool-proof as possible, and everything is under the eye of the pan operator. The fresh brine injected into the salt washes off all of the mother liquor and the gypsum and other impurities which are stuck to the faces of the salt crystals. The salt obtained with this method is by far purer than any heretofore made commercially. It is practically a pure salt made without the very expensive process of purifying the brine. It is possible to purify the brine and take out impurities, but this would not make a perfectly pure salt as it would pick up some impurities from the pipe lines and the pan itself, while with the apparatus and method herein described salt has been produced 99.80% pure.

Having thus described our invention, it is obvious that various immaterial modifications may be made in the same without departing from the spirit of our invention; hence we do not wish to be understood as limiting ourselves to the exact form, construction, arrangement and combination of parts herein shown and described or uses mentioned.

What we claim as new and desire to secure by Letters Patent is:

1. The process of refining salt consisting in withdrawing salt from an evaporating apparatus, adding salt brine thereto for washing and thinning said salt, and pumping the same to a centrifugal drier, a portion of the added brine being removed prior to discharge into the drier, and the salt and the remaining brine being agitated and co-mixed after the removal of said portion of the brine and before discharge into the drier, and removing the dried salt and discharging the brine into the evaporating apparatus.

2. The method of drying and washing salt consisting in withdrawing the salt from an evaporating pan, adding fresh brine thereto to wash the same, and carrying the same with the brine to a separator, thoroughly agitating and mixing the brine and salt, separate the excess brine from the salt by gravity, and removing the brine from the salt by centrifugal action, and returning the brine to the pan.

3. The method of drying salt consisting in subjecting brine to an evaporating process, withdrawing the salt and adding fresh brine as required and pumping the brine and salt to a separator, thoroughly mixing the salt and brine for imparting a smooth consistency to the mixture, and thence drying the salt by centrifugal action and removing the brine, permitting the brine to settle to remove the gypsum and withdrawing the brine and returning the same to the evaporator.

4. A method manufacturing salt from brine consisting in evaporating brine to separate the salt and permitting the salt to settle, removing the salt from the pan and screening the same and washing with fresh brine, thence allowing the co-mixed salt and fresh brine to settle, withdrawing a portion of the separated brine, agitating and mixing the salt and remaining brine, thence separating the brine and salt by centrifugal action, permitting the separated brine to settle to remove impurities and thence discharging the brine into the evaporating pan.

5. A method of manufacturing salt from brine consisting in evaporating brine and permitting the salt to settle, thence removing the same from the pan by a brine jet and screening the same and washing with fresh brine, allowing to settle, withdrawing a portion of the brine, mixing the salt and remaining brine, whereby the same flows freely, thence separating the brine and salt by centrifugal action, permitting the separated brine to settle to remove impurities and thence permitting the brine to flow to the evaporating pan.

6. In an apparatus of the kind described and in combination, an evaporating pan having a depending conduit, a screen box communicating therewith, a separating tank, a dryer, a settling tank and a brine feed tank, means for feeding salt from the conduit to the salt box, consisting of means for directing a jet of fresh brine into said conduit adjacent the outlet from the conduit to the screen box, means for injecting fresh brine into the screen box between the screen and said conduit, means for pumping the fresh brine and salt from the screen box to the tank, independent means for pumping brine into said separating tank, as required, said separating tank provided with an overflow communicating with said brine feed tank, said separator arranged to feed by gravity into said dryer, means for conducting brine separated by the dryer to said settling tank, said settling tank provided with an overflow into said brine feed tank, and means for conducting brine from said feed tank to the pan consisting of a conduit having a looped portion below the evaporating pan whereby a portion of the brine forms a seal in said conduit.

7. A method of manufacturing salt which comprises employing fresh brine to wash salt formed in an evaporator, transferring said salt and brine from said evaporator to a separator, allowing said salt to settle and washing it with fresh brine as it settles, removing some of the brine from the separator and discharging it into a settling tank, discharging the salt and the remainder of the brine from said separator and agitating them to mix them, delivering said salt and brine to a centrifugal dryer, discharging the brine from said dryer into said tank, and discharging the brine from said tank and returning it to said evaporator.

8. A method of manufacturing salt which comprises subjecting brine to an evaporating process, withdrawing the salt and brine from the evaporating device to a receptacle, adding fresh brine to the mixture in said receptacle for washing and thinning the salt, and for taking up the heat of crystalization thereof, separating the excess brine from the salt by gravity, agitating the said salt mixture to make it of substantially uniform consistency, and drying the mixture in a centrifuge, the liquid being returned to the evaporator.

9. A method of manufacturing salt which comprises subjecting brine to an evaporating process, withdrawing the salt and brine from the evaporating device to a receptacle, adding fresh brine to the mixture in said receptacle for washing and thinning the salt, and for taking up the heat of crystalization thereof, separating the excess brine from the salt by gravity, agitating the said salt mixture to make it of substantially uniform consistency, removing the liquid from said salt by means of a centrifuge, removing the undesirable salts from said liquid, and returning the purified liquid to the evaporator.

In testimony whereof, we have hereunto signed our names.

THOMAS RAY.
JOSHUA R. RAY.